United States Patent [19]
Askman et al.

[11] Patent Number: 5,487,905
[45] Date of Patent: Jan. 30, 1996

[54] PROCESS FOR THE PRODUCTION OF CANNELLONI

[75] Inventors: Lars Askman, Billesholm; Werner Leonhardt, Astorp; Ingemar Svahn, Odakra, all of Sweden

[73] Assignee: Nestec S.A., Vevey, Switzerland

[21] Appl. No.: 270,938

[22] Filed: Jul. 5, 1994

[30] Foreign Application Priority Data

Jul. 13, 1993 [EP] European Pat. Off. ............... 93111161

[51] Int. Cl.⁶ .................................................. A21C 9/06
[52] U.S. Cl. .................. 426/297; 426/283; 426/284; 426/138; 426/496; 426/502; 426/503; 426/512; 426/514; 426/517; 426/518; 425/112; 425/363; 425/391; 198/824
[58] Field of Search .................................. 426/282, 283, 426/284, 138, 390, 297, 391, 496, 502–504, 509, 512, 514, 517, 518; 425/110, 112, 113, 133.1, 363, 391, 294; 264/146, 339; 198/604, 611, 612, 620, 824

[56] References Cited

U.S. PATENT DOCUMENTS

| | | | |
|---|---|---|---|
| 3,669,007 | 6/1972 | Pulici | 426/297 X |
| 3,869,238 | 3/1975 | Racca | 425/294 |
| 4,084,493 | 4/1978 | Quintana | 426/297 X |
| 4,418,085 | 11/1983 | Becquelet | 426/297 |
| 4,515,817 | 5/1985 | Pavan | 426/557 X |
| 4,597,976 | 7/1986 | Doster et al. | 426/557 X |
| 4,778,685 | 10/1988 | Simelunas et al. | 426/297 |
| 4,876,104 | 10/1989 | McGuire et al. | 426/557 |
| 4,898,744 | 2/1990 | Liggett et al. | 426/557 |
| 4,992,285 | 2/1991 | Larsen | 426/297 |
| 5,290,577 | 3/1994 | Tashiro | 426/283 X |
| 5,330,776 | 7/1994 | Wikstroem | 426/502 X |

FOREIGN PATENT DOCUMENTS

| | | |
|---|---|---|
| 1440770 | 4/1966 | France . |
| 1450383 | 7/1966 | France . |
| 2649591 | 7/1989 | France . |
| 1037870 | 8/1966 | United Kingdom . |

*Primary Examiner*—Donald E. Czaja
*Assistant Examiner*—Milton I. Cano
*Attorney, Agent, or Firm*—Vogt & O'Donnell

[57] ABSTRACT

Cannelloni is prepared by, initially, forming and blanching a longitudinally extending pasta strand and then cutting the strand into a plurality of longitudinally-extending strips positioned side-by-side. Each strip is passed in a direction of its longitudinal extent to and by a roller having a configuration of a curved surface so that it is contacted by the roller surface to curve the strip so that the curved strip has an upper concave curved surface and a lower convex curved surface, the curved strip is transported on a conveyor belt so that the convex surface is carried by the belt, a filling is deposited onto the concave surface and the curved strip is formed, in particular, by passing the curved strip and filling through a ring positioned above the belt, into a tube for enclosing the filling and so that the strip overlaps, and then, the tube is cut into tubular pieces. Prior to cutting, a plurality of tubes formed from the side-by-side strips may be converged so that the tubes are brought into side-by-side contact and then cut to provide sets of plural contacting tubes.

11 Claims, 3 Drawing Sheets

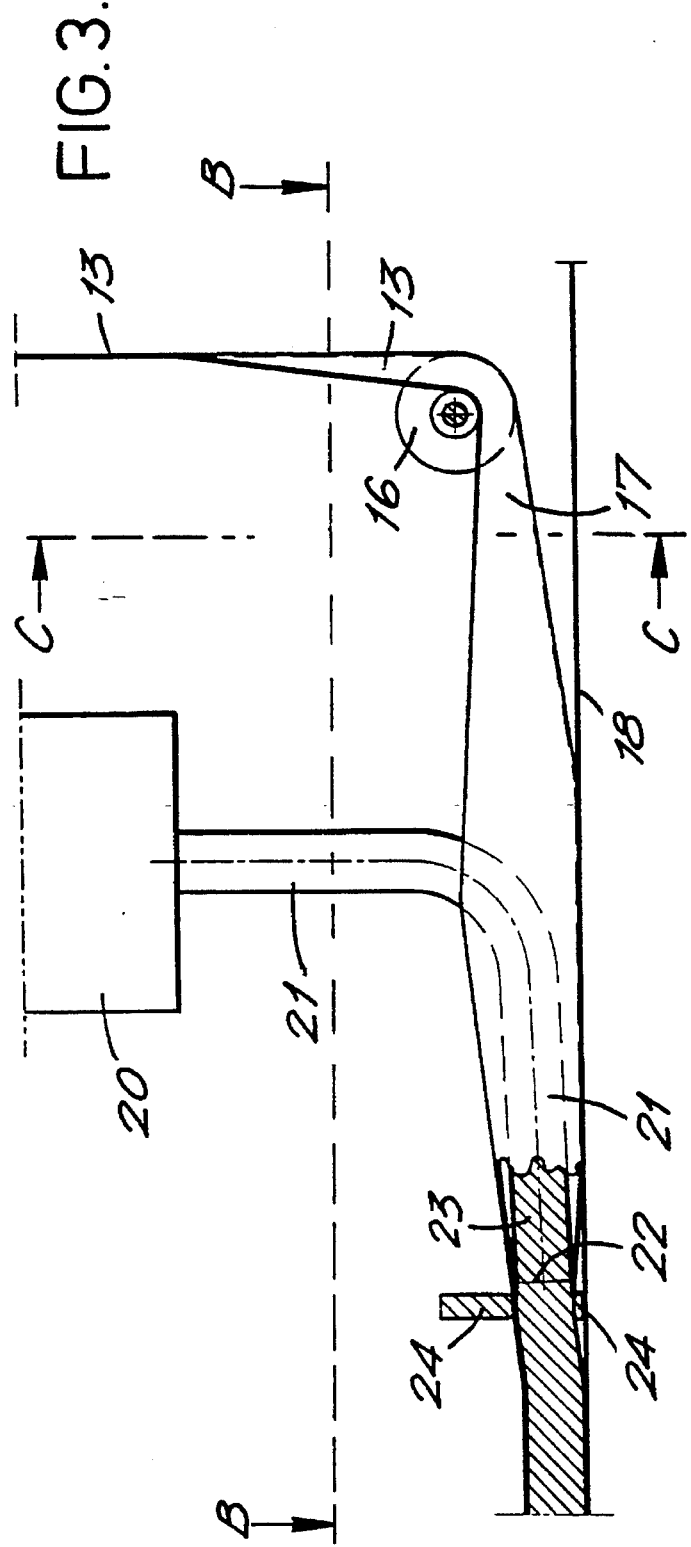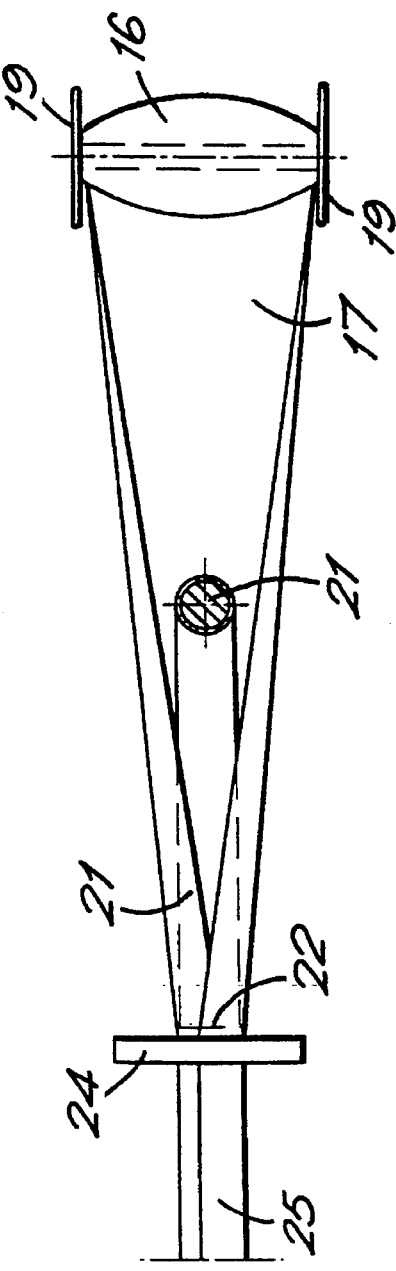

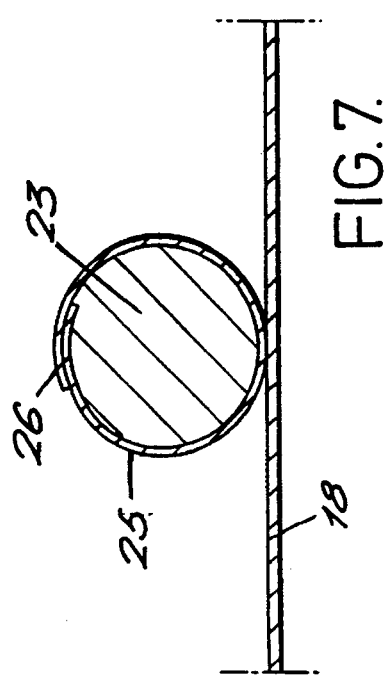
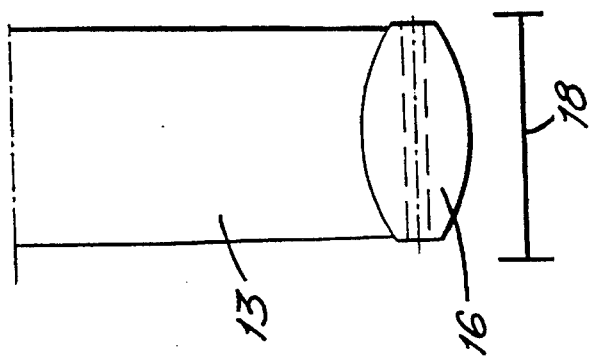
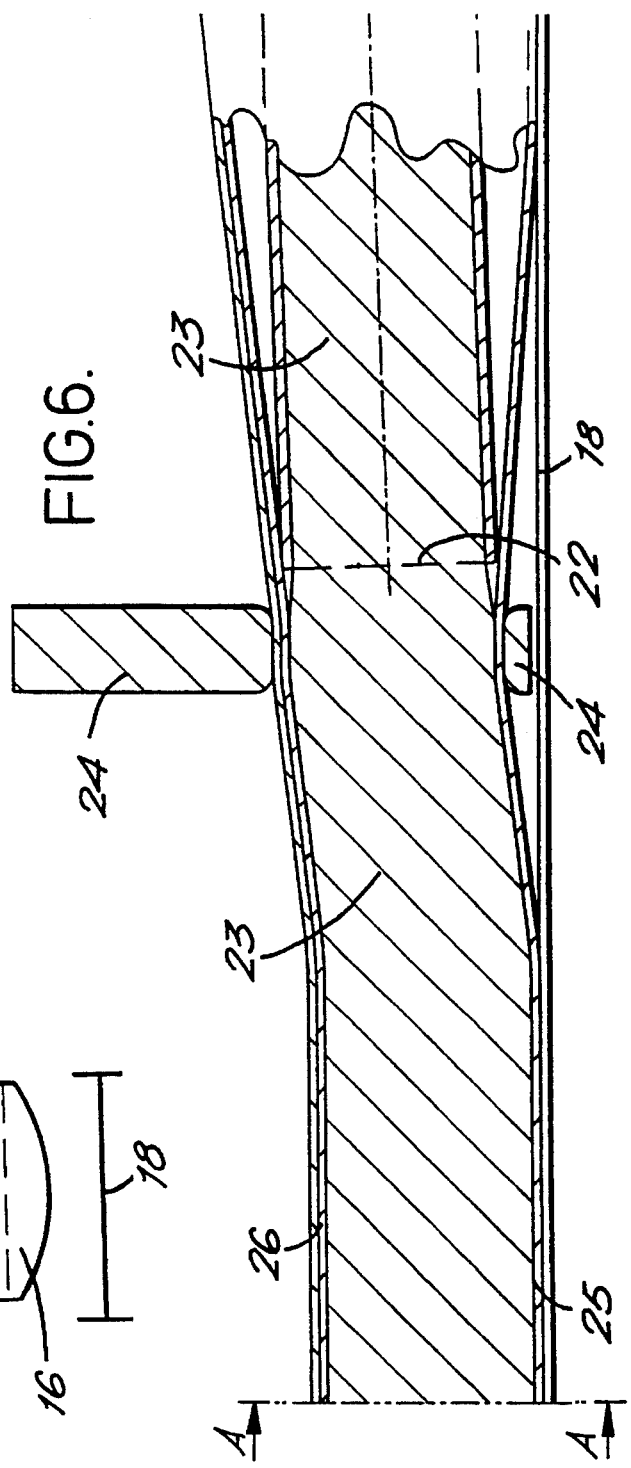

PROCESS FOR THE PRODUCTION OF CANNELLONI

BACKGROUND OF THE INVENTION

The present invention relates to a process for the continuous production of cannelloni.

Cannelloni is traditionally made manually in separate steps. However, not only is the pasta usually very sticky and slippery to handle, the process is extremely time and labour consuming.

SUMMARY OF THE INVENTION

We have now devised an automatic mechanical process which obviates the above disadvantages.

Accordingly, the present invention provides a process for the continuous production of cannelloni which comprises a. forming a blanched pasta strand, b. cutting the blanched pasta strand longitudinally into a plurality of strips lying side by side, c. preforming the strips into curved strips by training the strips around preforming devices shaped to cause the longitudinal edges of the strips to pass out of the plane of the longitudinal axis of the strips, d. passing the curved strips with their concave surfaces facing upwards onto a conveyor belt, and e. transporting the curved strips downstream on the conveyor belt and depositing a filling onto the curved strips and forming the curved strips into closed tubes each having an overlap seam.

DETAILED DESCRIPTION OF THE INVENTION

In carrying out the process of the invention, the blanched pasta strand may be formed by any conventional method, e.g. where the pasta dough is extruded from a kneader/ sheeter to give a strand which is passed onto a conveyor belt which transports the strand through a blanching tank containing hot water and then out of the blanching tank onto a cooling conveyor. The width of the blanched, cooled pasta strand may be any suitable width depending upon the final shape of the cannelloni.

Advantageously, the blanched pasta strand is transported on a conveyor belt, which may conveniently be a cooling conveyor belt, above which are positioned one or more cutting devices, e.g. rotating circular knives, adapted to cut the pasta strand longitudinally into a plurality of strips lying side by side. The maximum number of strips is unlimited depending upon the diameter of the cannelloni and the available width of pasta strand before cutting. However, the usual number of strips in 4, 5 or 6.

Each of the strips is then trained around a separate preforming device, e.g. a preforming roller, to form the curved strips. Each preforming roller is advantageously convex-shaped whereby its circumference is convex along its longitudinal surface so that the diameter increases to a maximum at approximately the mid-point between the two sides of the roller. The preforming rollers are conveniently arranged side by side in a row and are preferably positioned at or above the upstream end of the cannelloni-forming conveyor belt. The pasta strips are preferably trained around and beneath the preforming rollers so that they pass onto a conveyor belt with their concave surfaces upwards.

It is also possible for the preforming roller to be concave shaped whereby its circumference is concave along its longitudinal surface so that the diameter is at minimum at approximately the mid-point between the two sides of the roller. In this case, the pasta strips are preferably trained around and above the preforming rollers so that they pass onto a conveyor belt with their concave surfaces upwards. Advantageously, means are provided for holding down the pasta strip onto the concave surface of the roller.

The filling is conveniently deposited onto the curved strips from a filling nozzle whose opening is preferably positioned immediately upstream of the position where the curved strips are formed into closed tubes. The filling nozzle is conveniently attached to a filling pump and preferably is bent so that the end part provided with the opening lies substantially parallel to and within the curved strip.

Immediately after blanching, the pasta strands are slippery and before forming into closed tubes, it is desirable to make the surface of the strands or the strips sticky, e.g. by cooling. The maximum temperature depends on the type of pasta but usually the pasta should be cooled to below 80° C., preferably below 60° C. and more preferably below 40° C.

The means for forming each of the curved strips into a closed tube is conveniently provided by a forming ring positioned just above a conveyor belt with its circumferential plane transverse to the direction of the travel of the belt. Each of the curved strips is raised above the conveyor belt and passed through the forming ring to form the closed tube after which the closed tube is again supported by the conveyor belt. Each closed tube is formed with an upper overlap seam, the width of which depends on the stickiness of the pasta and the stiffness of the filling. The width of the overlap may be as much as the diameter of the cannelloni but is usually from 30 to 60% of the diameter of the cannelloni. The width may be less than 30% of the diameter of the cannelloni provided the two surfaces of the overlap seam stick together.

Advantageously, the filling is deposited from the filling nozzle simultaneously with the tubular formed pasta being passed through the forming ring.

After passing through the forming ring the tubular pasta enclosing the filling, shaped like a continuous cannelloni, is prevented from falling apart by the stickiness of the pasta in the overlap seam and the high viscosity and stickiness of the filling. The tubular pastas, which are spaced from one another on the conveyor belt are then conveniently impelled into contact with the adjacent pastas by any suitable means, e.g. a plough, and afterwards cut into the final cannelloni products, e.g. by passing beneath a guillotine knife.

The present invention also provides a machine for the continuous production of cannelloni which comprises:

a. means for cutting a blanched pasta strand longitudinally into a plurality of strips, b. preforming devices around which the strips are to be trained and shaped to cause the longitudinal edges of the strips to pass out of the plane of the longitudinal axis of the strips to form curved strips, c. a conveyor belt for transporting the curved strips thereon, d. means for depositing a filling onto the curved strips, and e. means for forming the curved strips into closed tubes each having an overlap seam simultaneously with the deposit of the filling.

BRIEF DESCRIPTION OF THE DRAWINGS

The present invention is further illustrated by way of example with reference to the accompanying drawings.

FIG. 3 represents a side plan view of part of the machine according to FIG. 1 showing more detail.

FIG. 4 represents a sectional view along the line B—B in FIG. 3 looking in the direction of the arrows.

FIG. 5 represents a sectional view along the line C—C in FIG. 3 looking in the direction of the arrows.

FIG. 6 represents a side view of a forming ring and filling nozzle.

FIG. 7 represents a sectional view along the line A—A in FIG. 6 looking in the direction of the arrows.

DETAILED DESCRIPTION OF THE DRAWINGS

Figure 1:
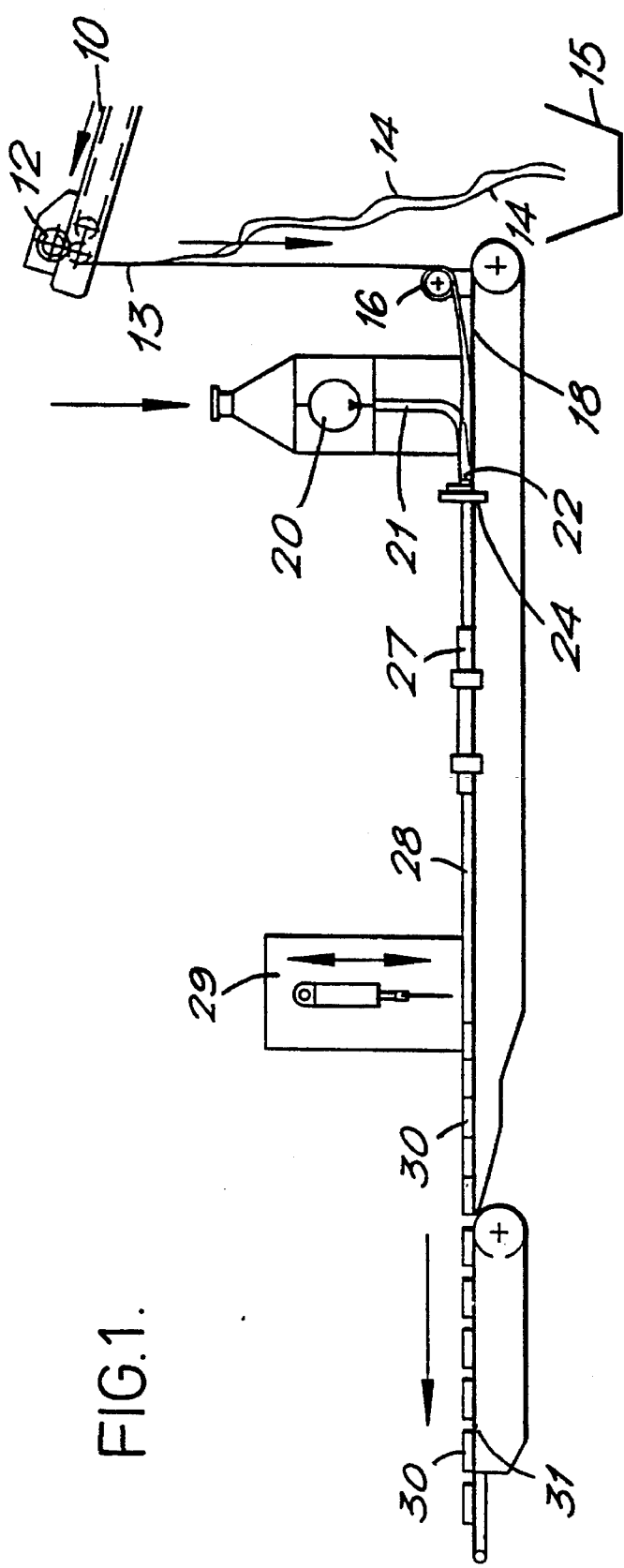
FIG. 1 represents a side plan view of a machine according to the invention.
Figure 2:
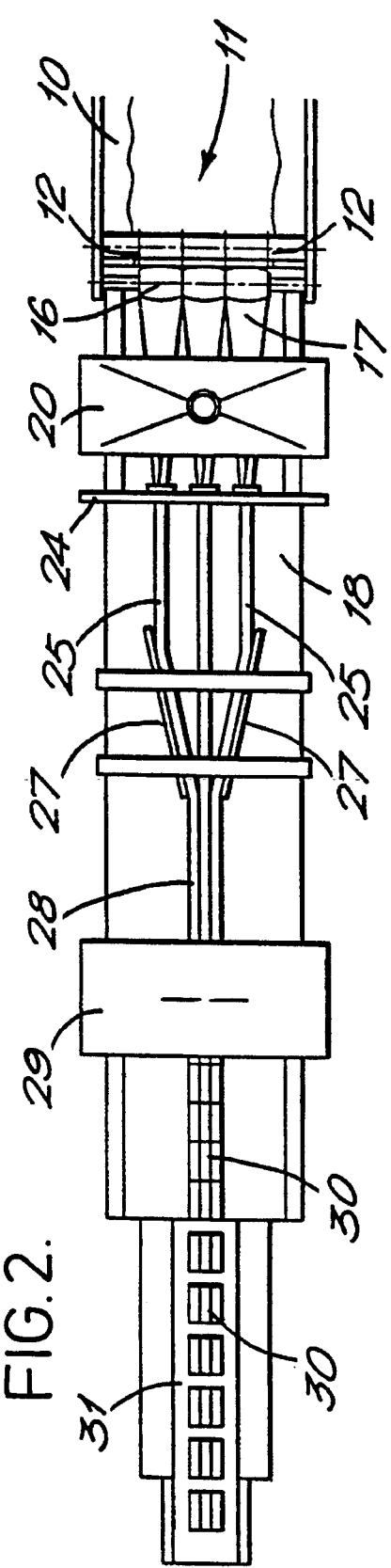
FIG. 2 represents a top plan view of the machine of FIG. 1.

Referring to the drawings, as illustrated in FIGS. 1 and 2, the machine comprises a cooling conveyor 10 transporting a blanched, cooled pasta strand 11, having a width of 30 cm.

Positioned above the cooling conveyor 10 at its downstream end are four rotating circular knives 12 for cutting the pasta strand 11 longitudinally into three central strips 13 and two scrap strips 14 one from each edge of the strand 11 which fall into a container 15.

Three convex preforming rollers 16, around which the central strips 13 may be trained to form curved strips 17, are positioned above the upstream end of a conveyor belt 18. (See also FIG. 5). As illustrated in FIG. 4, the preforming rollers 16 are provided with side guides 19. Downstream of the preforming rollers 16 is a filling pump 20 fitted with three filling nozzles 21 each having an opening 22 containing filling 23 (FIG. 3) and downstream of the filling nozzles are three forming rings 24 for forming closed tubes 25 each having an overlap seam 26 from the curved strips 17 (see also FIGS 6 and 7).

As also illustrated in FIGS. 1 and 2, a pair of ploughs 27 is provided for guiding the three closed tubes 25 into contact with each other to form a continuous cannelloni strip 28 above which is a guillotine cutter 29 for cutting the strip 28 into individual cannelloni pieces 30. Beyond the downstream end of the conveyor belt 18 is an acceleration belt 31.

In operation, the blanched, cooled pasta strand 11 is cut longitudinally by the knives 12 into three central strips 13 from which the cannelloni is made and two scrap strips 14 from the edges which fall into the container 15. The pasta strips 13 are trained around the convex preforming rollers 16 which cause the longitudinal edges of the strips to bend to form curved strips 17 which are transported on the conveyor belt 18 to the filling pump 20. Each filling nozzle 21 is bent so that the end part lies parallel to the conveyor belt partially surrounded by the sides of the curved strips 17. The opening 22 of each filling nozzle is positioned just upstream of each final forming ring 24 and the curved strips 17 are raised above the conveyor belt 18 as they are transported to pass through the forming rings where they are formed into closed tubes 25 while simultaneously the filling 23 deposited is issued into the curved strips 17 from the openings 22 of the filling nozzles 21 in a direction of transport of the strips (FIGS. 3, 4, and 6) form three closed tubes 25 each with an overlap seam 26 having a width half the diameter of the cannelloni and containing filling 23.

The closed tubes are transported past the ploughs 27 where they are guided to contact one another and form a continuous cannelloni strip 28 which is then cut by the guillotine cutter 29 into individual cannelloni pieces 30. The cannelloni pieces 30 are then transferred from the downstream end of the conveyor belt 18 onto an accelerator belt 31 which separates the pieces 30 from one another for further processing.

The whole process is electronically controlled by a computer.

We claim:

1. A process for the continuous production of cannelloni comprising the steps of:

forming and blanching a longitudinally extending pasta strand to obtain a blanched strand;

cutting the blanched strand along its longitudinal extent into a plurality of strips to obtain longitudinally extending strips positioned side-by-side; and with respect to each strip:

passing the strip in a direction of its longitudinal extent to and by a roller having a configuration of a curved surface and contacting the strip with the roller surface to curve the strip so that the curved strip has an upper curved surface which is concave in shape and a lower curved surface which is convex in shape, transporting the curved strip on a conveyor belt so that the convex surface is carried by the belt and depositing a filling onto the concave surface and forming the curved strip into a tube for enclosing the filling within the tube and so that the strip overlaps, and then, cutting the tube into tubular pieces.

2. A process according to claim 1 wherein the curved strip and filling are passed from the belt through a ring positioned above the belt for forming the tube and then to the belt for transporting the tube for cutting.

3. A process according to claim 1 or 2 wherein the roller has a diameter which increases from opposing roller edges to a maximum at approximately a mid-point between the roller edges.

4. A process according to claim 1 or 2 wherein the plurality of strips are formed into spaced-apart tubes which are transported in a direction of their longitudinal extent and further comprising, prior to cutting, converging a plurality of the tubes so that the tubes are brought into contact side-by-side and then cutting the plurality of tubes in contact into sets of plural contacting tubes.

5. A process according to claim 1 or 2 wherein the filling is deposited at a position so that the tube is being formed about the filling during deposit of the filling.

6. A process according to claim 1 wherein the filling deposited is issued from a nozzle in a direction of transport of the strip.

7. A process according to claim 2 wherein the filling deposited is issued from a nozzle in a direction of transport of the strip.

8. A process according to claim 4 wherein the filling deposited is issued from a nozzle in a direction of transport of the strip.

9. A process according to claim 1 or 2 further comprising, after blanching, cooling the strand so that the strand is sticky.

10. A process according to claim 1 or 2 further comprising, after blanching and before cutting the strand, transporting the strand on a cooling conveyor for cooling the strand so the strand is sticky.

11. A process according to claim 1 or 2 wherein the curved strip is formed into the tube so that the strip overlap extends for a distance of from 30% to 60% of a diameter of the tube.

* * * * *